United States Patent [19]

Saitoh

[11] Patent Number: 5,778,126
[45] Date of Patent: Jul. 7, 1998

[54] FERRULE FOR OPTICAL FIBER AND OPTICAL CONNECTOR USING A FERRULE

[75] Inventor: Yasuhiko Saitoh, Hokaidou, Japan

[73] Assignee: Kyocera Corporation, Kyoto, Japan

[21] Appl. No.: 703,649

[22] Filed: Aug. 27, 1996

[30] Foreign Application Priority Data

May 31, 1995 [JP] Japan ................................. 7-50217
Aug. 31, 1995 [JP] Japan ................................. 7-224120

[51] Int. Cl.⁶ ........................................ G02B 6/36
[52] U.S. Cl. ........................ 385/84; 65/404; 264/1.1
[58] Field of Search ............................... 385/60, 70, 66, 385/72, 84, 85, 139, 147, 68, 77; 264/1.1, 1.21, 1.24, 2.1, 2.2, 2.3, 2.5, 2.7, 56, 63, 513; 65/385, 404

[56] References Cited

U.S. PATENT DOCUMENTS

| 4,815,809 | 3/1989 | Szostak ............................ 385/84 |
| 4,842,363 | 6/1989 | Margolin et al. .................. 385/84 |
| 5,216,734 | 6/1993 | Grinderslev .................... 385/84 X |
| 5,278,928 | 1/1994 | Ueda et al. ....................... 385/84 |
| 5,615,291 | 3/1997 | Hayakawa et al. .............. 385/97 |

FOREIGN PATENT DOCUMENTS 750217   5/1995   Japan .

*Primary Examiner*—Akm E. Ullah
*Attorney, Agent, or Firm*—Loeb & Loeb LLP

[57] ABSTRACT

A ferrule includes a cylindrical ceramic main body and a metal or plastic back body mated to an end of the ceramic main body. The cylindrical ceramic main body has an axial bore adapted for holding an optical fiber core in fixed relation to the cylindrical ceramic main body. The metal or plastic back body has an axial, central opening adapted for holding a jacketed portion of an optical fiber which terminates through a stepped or sloped end to a smaller axial, central opening adapted for holding an optical fiber core. At the interface between the cylindrical ceramic main body and the metal or plastic back body, the cylindrical ceramic main body has a substantially planar face and a curving central portion that joins the planar face to the axial bore of the cylindrical ceramic body.

9 Claims, 5 Drawing Sheets

FERRULE FOR OPTICAL FIBER AND OPTICAL CONNECTOR USING A FERRULE

BACKGROUND OF THE INVENTION

The present invention relates to a ferrule for optical fiber mounted on an optical connector for mutually connecting optical fibers used in optical communications.

As shown in FIGS. 8 and 9, an optical connector C for mutually connecting an optical fiber 2 and an optical fiber installed at an adapter side has a ferrule 1 for holding the optical fiber 2 so that it may be exposed from the leading end, provided in a plastic frame 4 so as to thrust a spring 3 from the rear side, and as shown in FIG. 10, a pair of pawls 41, 41 of nearly rectangular section are disposed at confronting positions in a drilled wall of a flange 11 having the larger end of a back body 1a of the ferrule 1 provided in the plastic frame 4, and rotation of the ferrule 1 is prevented by fitting into interrupt recesses 12 formed at confronting positions of the larger end of the back body 1a, thereby minimizing the connection loss.

Japanese Patent Publication 7-50217 discloses a conventional ferrule for optical fiber (hereinafter called ferrule) to be mounted on an optical fiber 2, in which the back body is formed of a resin material that is fusible by ultrasonic waves, and the resin coat layer of the fiber and the ferrule are coupled together only by heating and fusing by ultrasonic waves, and this ferrule has a penetration hole of the back body side as larger hole, and a taper hole is formed at the same side so as to be continuous with the smaller hole of the ferrule main body side.

FIG. 11 relates to a conventional ferrule 1, in which the cylindrical main body 1b of the ferrule is made of ceramics, and the back body 1a is made of metal, and in this ferrule 1, a taper hole 24 and a smaller hole 22 are formed at the cylindrical main body side 1b.

These prior arts had, however, the following problems.

In the conventional ferrules making use of ultrasonic fusion, there is a boundary of the taper hole and smaller hole on the junction end of the ferrule man body and back body, and the taper hole and smaller hole are not perfectly matched in this area, but a large-step difference was present.

When inserting the fiber into the ferrule, the taper hole is used as the insertion guide, and the fiber is inserted into the smaller hole of the ferrule main body, and at this time the leading end of the fiber advancing obliquely to the smaller hole is caught by the step difference, and a tiny crack may be formed in the fiber by this shock.

In the other conventional ferrule 1 shown in FIG. 11 in which the back body 1a is made of metal, it took time and labor in processing the ceramic cylindrical main body 1b in a nearly conical form in order to form the taper hole 24.

Besides, there was an edge corner 32 in the boundary of the smaller hole 22 and taper hole 24 in the cylindrical main body 1b, and the fiber surface might be scratched by it.

FIG. 12 is a magnified view of part A in FIG. 11, in which if the edge corner 32 can be formed in a round form by injection forming or the like (left side), the edge corner 32 becomes angular by processing the smaller hole 22 in a later process (right side).

The invention is devised in the light of the above problems of the prior arts, and it is an object thereof to provide a ferrule capable of preventing from injuring the fiber or forming tiny crack inside when inserting the fiber into the ferrule, and small in manufacturing cost.

To solve the problems of the prior arts, the ferrule of the invention is a ferrule for optical fiber composed of a ceramic-made cylindrical body and a metal-made or plastic made back body, wherein a penetration hole formed in the axial direction of the back body is a stepped hole forming a larger hole and a smaller hole continuously through a taper hole, and the brim of the penetration hole formed in the rear end surface of the cylindrical main body has a curved surface with a radius of curvature R of 0.2 to 0.5 mm.

An optical connector used the present invention ferrule for an optical fiber touch mutually optical fibers, transmit an optical signal between the optical fiber, connect the optical fiber to an optical semi-conductor element, transmit an optical signal between the optical fiber and the optical semi-conductor element.

EMBODIMENTS

Some of the embodiments of the invention are described below while referring to the accompanying drawings.

Figure 1:
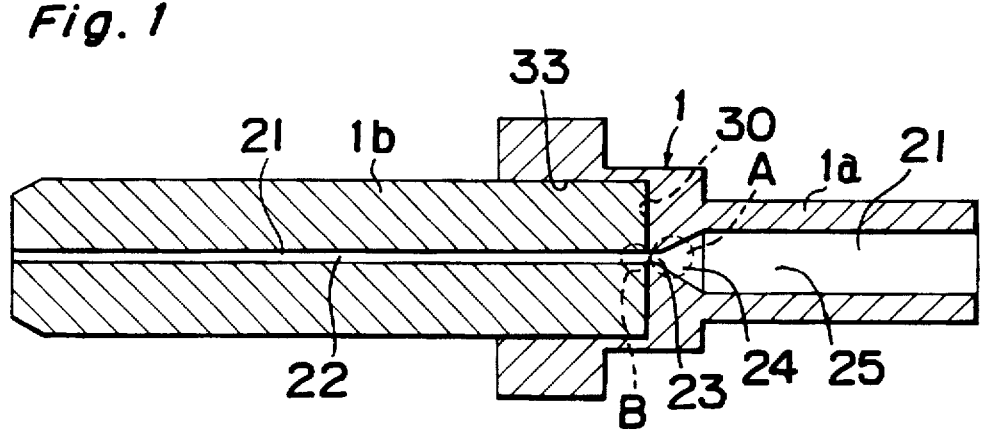
FIG. 1 is a sectional view of a ferrule for optical fiber in an embodiment of the invention.

FIG. 1 shows a ferrule 1 in an embodiment, and this ferrule 1 is formed by fitting a cylindrical main body 1b made of ceramics such as zirconia into a mounting hole 33 of a back body 1b made of metal such as stainless steel or made of plastic, and both ends of the ferrule 1 are opened, and there is a penetration hole 21 extending in the axial direction of the cylindrical main body 1b and the back body 1a.

This penetration hole 21 is formed in a specific diameter as a smaller hole 22 in the cylindrical main body 1b, and at the back body 1a side, it is formed as a smaller hole 23 substantially in the same diameter as the smaller hole 22 provided in the cylindrical main body 1b near the junction 30 with the cylindrical main body 1b, and behind it is formed a taper hole 24 as a fiber insertion guide, and further behind a larger hole 25 is provided, and the larger hole 25 and taper hole 24 are filled with adhesive after inserting the fiber so that the fiber may be fixed.

The ferrule 1 in this embodiment thus constituted is a ferrule 1 composed of a ceramic-made cylindrical main body 1b and a metal-made or plastic-made back body 1a, and the penetration hole 21 formed in the axial direction of the back body 1a is a stepped hole comprising a larger hole 25 and a smaller hole 23, and the boundary of the taper hole 24 and smaller hole 23 is formed without step difference at the back body 1a side, and therefore when inserting the fiber into the ferrule 1, the fiber 2 is smoothly guided into the smaller hole 23, and when passing through the boundary of the smaller hole 23 of the back body 1a and the smaller hole 22 of the cylindrical main body 1b, the fiber passes through straightly, and hence if there is a slight step difference in the boundary of the both smaller holes 22, 23, problems of injury of the fiber or formation of tiny cracks due to the fiber 2 being caught in the step difference may hardly occur.

Figure 2:
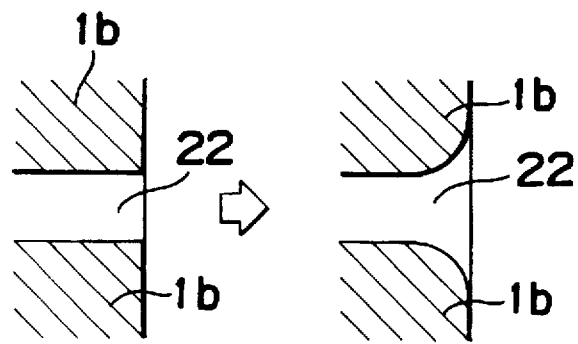
FIG. 2 is a magnified sectional view of part B in FIG. 1.
Figure 12:
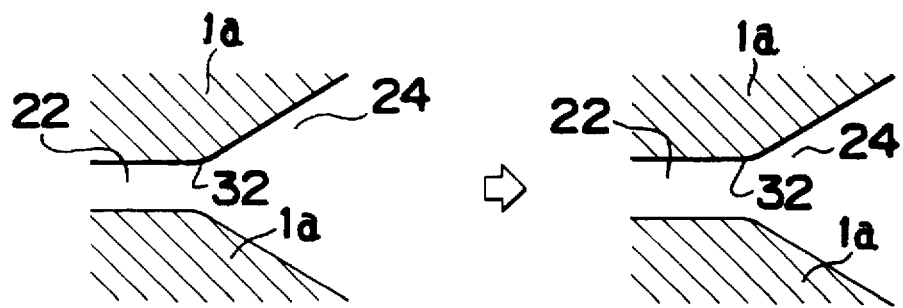
FIG. 12 is a magnified sectional view of part A in FIG. 11.

FIG. 2 is a magnified view of part B in FIG. 1, showing the process of forming the smaller hole 22 (left side) followed by curvature finishing. Therefore, there is no corner part such as edge corner 32 in FIG. 12, and the fiber surface will not be injured. Moreover, as shown in FIG. 3, when the fiber center axis is deviated from the center axis P of the smaller hole 23 of the back body 1a side at the time of insertion, the leading end of the fiber 2 slides on the curved surface, and problems of the fiber 2 being caught by rough edge may hardly occur.

Incidentally, the distance E between the center axis Q of the smaller hole 22 of the cylindrical main body 1b and the center axis P of the smaller hole 23 of the back body 1a is preferred to be 20 μm or less. When this distance is not more than 20 μm, catching problems of fiber 2 rarely occur, but when larger than 20 μm, such possibility increases slightly.

Figure 3:
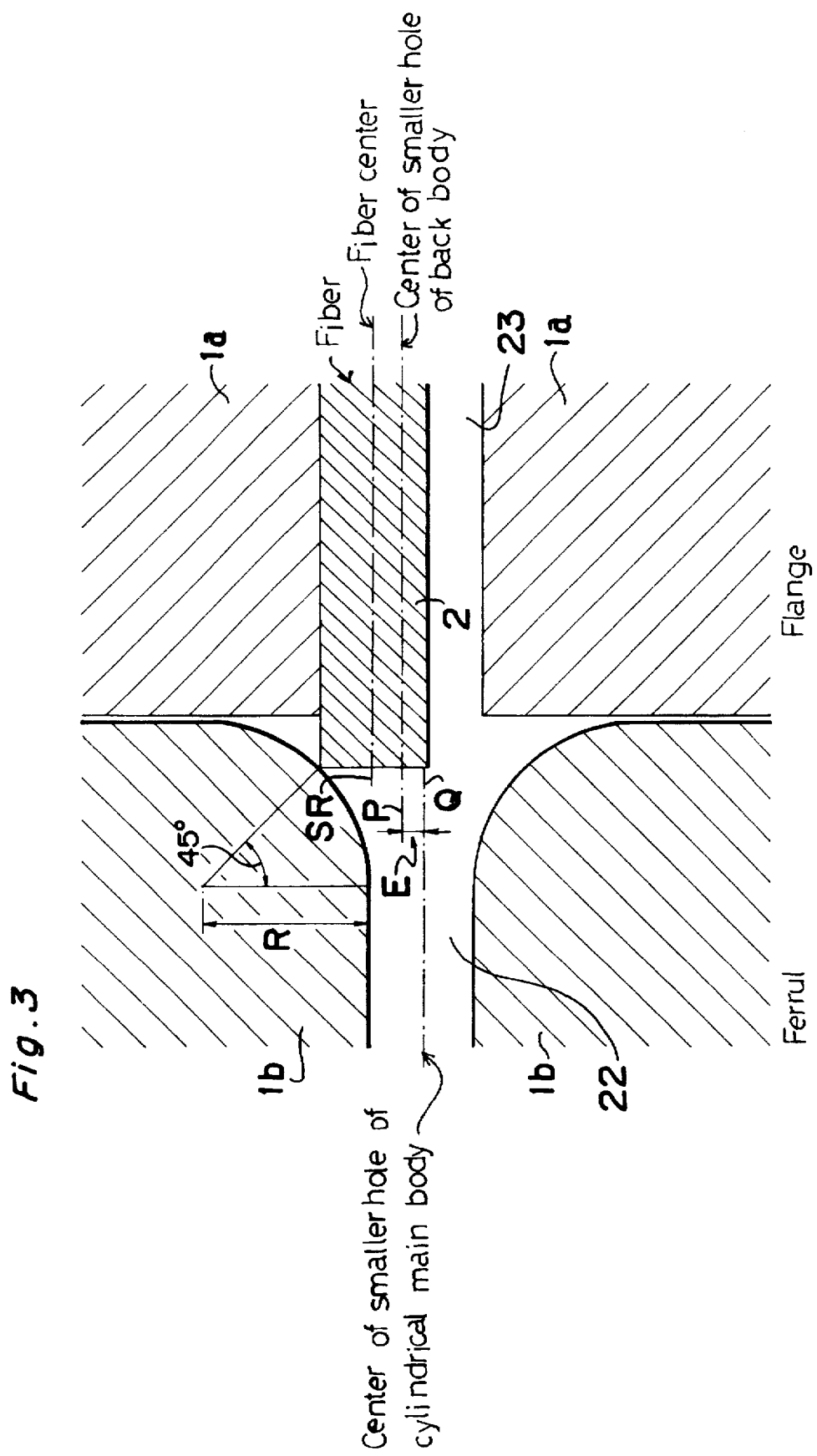
FIG. 3 is a magnified sectional view of part B in FIG. 1.

FIG. 3 shows the configuration of the parts, and the smaller hole 22 of the cylindrical main body 1b is usually 0.126 mm in diameter.

The smaller hole 23 of the back body 1a is preferred to be in the same diameter as the smaller hole 22 of the cylindrical main body 1b, but actually it may be set about 0.2 mm in diameter in consideration of the problem of processing precision due to mutual axial deviation.

The brim of the rear end side of the smaller hole 22 provided in the cylindrical main body 1b is preferably larger in the radius of curvature R of the curved surface, but in consideration of the processing cost and improvement of insertion of fiber, the radius of curvature R is properly about 0.2 to 0.5 mm.

When inserting the fiber 2, the fiber leading end is guided into the smaller hole 22 of the cylindrical main body 1b, and at this time it cannot be inserted smoothly unless the angle of the curved surface of the brim and the tangential line is 45 degrees or less. That is, the deviation of the fiber 2 is allowed up to R (1–sin 45°).

Supposing the fiber is shifted to one end at maximum in the smaller hole 23 of the back body 1a, since the diameter of the smaller hole 23 is 0.2 mm and the outer diameter of the fiber 2 is 0.125 mm, the distance between the center axis S of the fiber 2 and the center axis P of the smaller hole 23 of the back body 1a is 0.0375 mm.

Herein, supposing the distance between the center axis Q of the smaller hole 22 of the cylindrical main body 1b and the center axis P of the smaller hole 23 of the back body 1a to be E, the relation E+0.0375<R (1–sin 45°) is established.

That is, from E+0.0375<0.2 (1–0.707), it follows that E<0.0211, and it is known that the distance E between the center axis Q of the smaller hole 22 of the cylindrical main body 1b and the center axis P of the smaller hole 23 of the back body 1a is preferred to be 20 μm or less.

Figure 4:
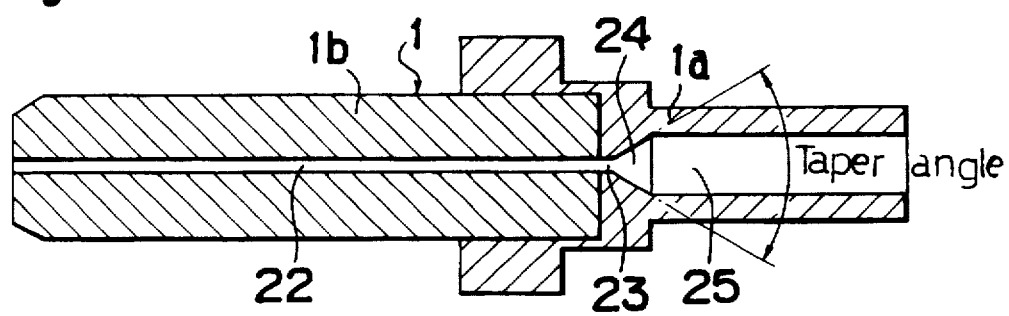
FIG. 4 is a sectional view of a ferrule showing a taper angle of a taper hole of the ferrule for optical fiber in FIG. 2.

The taper angle of a taper hole 24 of the back body 1a shown in FIG. 4 is preferred to be 10 to 90 degrees. That is, if less than 10 degrees, the taper portion is too long, and processing of the back body 1a is difficult, or, to the contrary, if exceeding 90 degrees, the resistance is large when the fiber 2 slides along the taper, and the working efficiency becomes poor.

Figure 5:
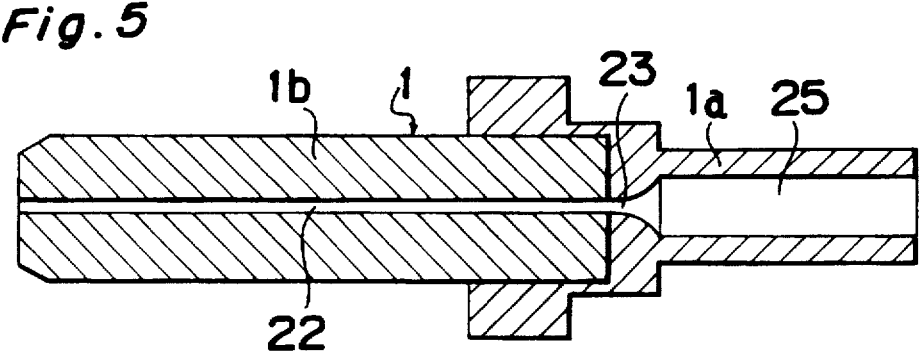
FIG. 5 is a sectional view of a ferrule for optical fiber in other embodiment of invention.
Figure 6:
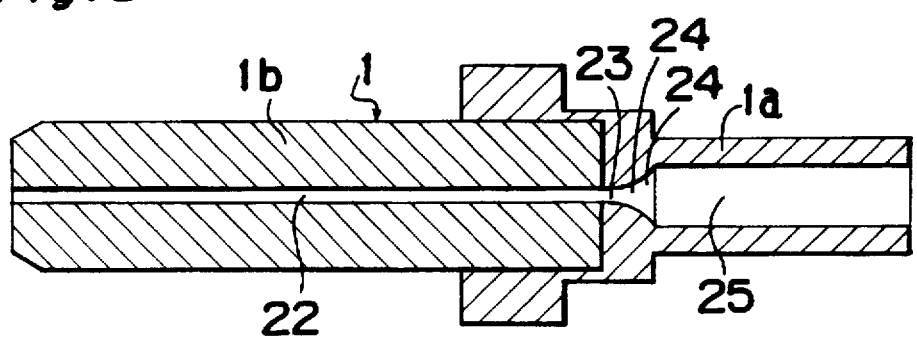
FIG. 6 is a sectional view of a ferrule for optical fiber in other embodiment of the invention.
Figure 7:
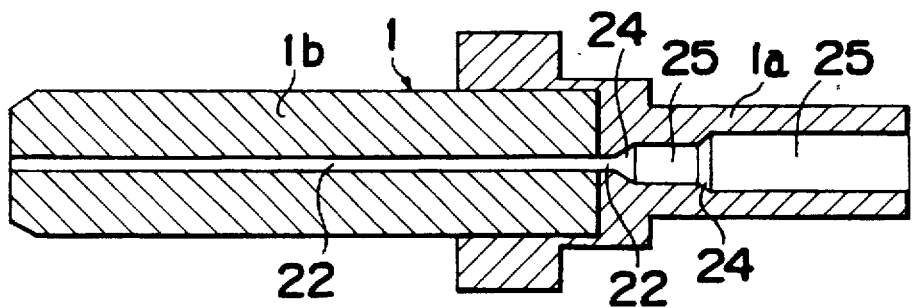
FIG. 7 is a sectional view of a ferrule for optical fiber in other embodiment of the invention.
Figure 8:
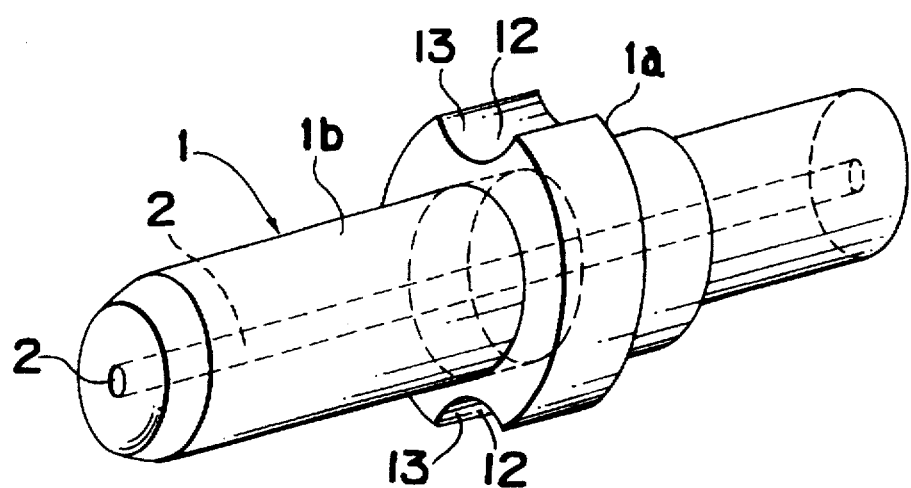
FIG. 8 is a perspective view showing a structure of ferrule for optical fiber.
Figure 9:
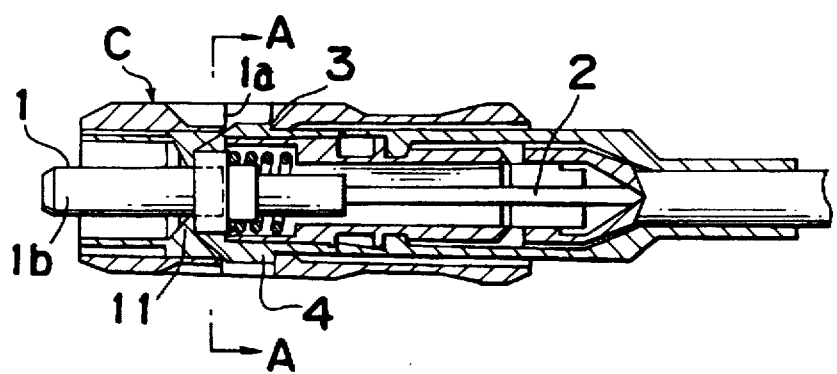
FIG. 9 is a sectional view showing a structure of an optical connector.
Figure 10:
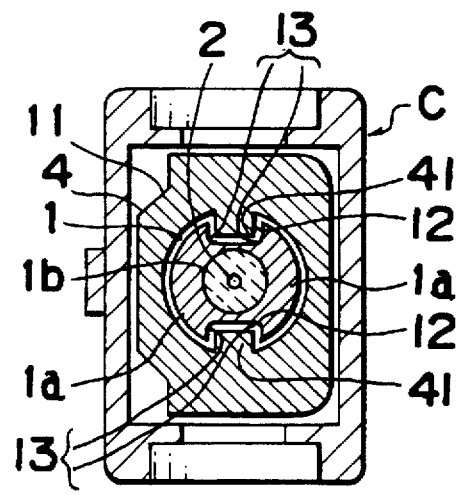
FIG. 10 is a sectional view of line A—A in FIG. 9.
Figure 11:
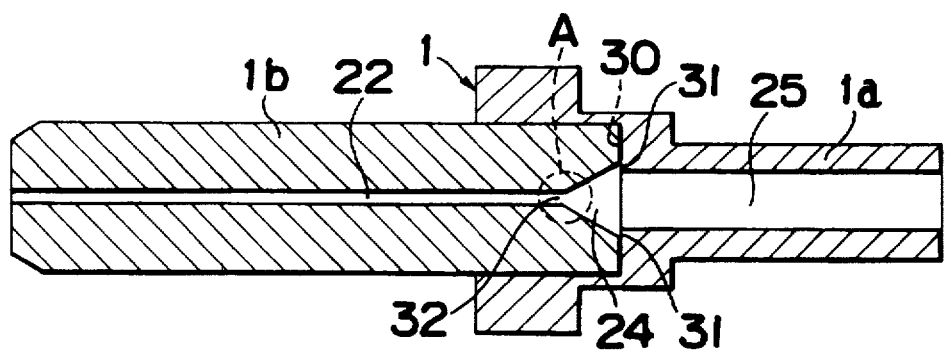
FIG. 11 is a sectional view of a conventional ferrule for optical fiber.

Other embodiments of the invention are disclosed in FIG. 5 through FIG. 7, that is, the ferrule 1 shown in FIG. 5 is composed so that the larger hole 25 and smaller hole 23 of the back body 1a may be continuous through a curved surface, the ferrule 1 in FIG. 6 has two stages of taper holes 24, 24 formed between the larger hole 25 and smaller hole 23, and the ferrule 1 in FIG. 7 has an intermediate hole 26 formed between the larger hole 25 and smaller hole 23, so that all holes may be continuous th rough the taper hole 24. These ferrules 1 are designed so that the fiber 2 may be smoothly guided and inserted into the ferrule 1.

EXAMPLES

In the ferrule 1 of the invention shown in FIG. 1, defining:

smaller hole of cylindrical main body: φ0.126 mm smaller hole of back body 1a: φ0.2 mm taper angle of taper hole 24 of back body 1a: 60° while the distance E between the center axis P of the smaller hole 23 of the cylindrical main body 1b and the center axis Q of the back body was varied as shown in Table 1, and the following experiment was conducted. Meanwhile, the distance E was determined by measuring the axial deviation of the mounting hole 33 and smaller hole 23 in the back body 1a alone by means of roundness measuring instrument. The axial deviation of the smaller hole 22 of the ferrule 1 and outer diameter was 0.5 μm or less and was hence ignored.

In these samples, fibers were actually inserted, and the smoothness of insertion was evaluated, of which results are summarized in Table 1.

TABLE 1

| Distance E between axes (μm) | Result |
| --- | --- |
| 16 | No problem |
| 22 | No problem |
| 28 | Slight catching, but possible to insert |
| 34 | Slight catching, but possible to insert |
| 40 | Impossible to insert |

As show in Table 1, as far as the distance E between axes was less than 20 μm there was no problem at all, and if less than 40 μm, it was possible to insert in spite of catching. By contrast, when the distance E between the axes was over 40 μm, it was impossible to insert.

As described herein, according to the invention, in the ferrule composed of a ceramic-made cylindrical main body and metal- or plastic-made back body, by forming the penetration hole provided in the axial direction of the back body in a stepped hole comprising a larger hole and a smaller hole, and forming the taper hole at the back body side, it is not necessary to process the rear end side of the ceramic-made cylindrical main body in a nearly conical form, and it does not need time and labor, so that it is very advantageous in manufacturing cost.

Moreover, since the boundary of the taper hole and smaller hole is formed without step difference at the back body side, when inserting the fiber into the ferrule, fiber is smoothly guided into the smaller hole, and when passing through the boundary of the smaller hole of the back body and the smaller hole of the cylindrical main body, the fiber passes straightly, and if there is a slight step difference in the boundary between the two smaller holes, problems of the fiber being caught in the step difference to be damaged or formation of tiny cracks may hardly occur.

Sill more, since the inlet of the smaller hole of the cylindrical main body is a curved surface, the fiber surface will not be injured by the edge angle.

Thus, the invention brings about excellent effects.

What is claimed is:

1. A ferrule for an optical fiber comprising a ceramic-made cylindrical main body having a penetration hole formed in the axial direction for inserting an optical fiber, and a metal-made or plastic-made back body for fixing and holding the rear and side of said cylindrical main body, wherein a penetration hole formed in the axial direction of said back body is a stepped hole having a larger hole and a smaller hole continuous through a taper hole, wherein a brim of said penetration hole formed in a rear end surface of said cylindrical main body has a curved surface, a boundary diameter between said brim and said rear end surface being larger than said smaller hole in said back body.

2. A ferrule for an optical fiber of claim 1, wherein the deviation distance between the center axis of the penetration hole in the cylindrical main body and the center axis of the smaller hole in the back body is 20 μm or less.

3. A ferrule for an optical fiber of claim 1, wherein the brim of the penetration hole is a curved surface with a radius of curvature of 0.2 to 0.5 mm.

4. An optical connector comprising a ferrule for an optical fiber, the ferrule comprising:

a ceramic cylindrical main body having an axial penetration hole for inserting an optical fiber; and a back body for fixing and holding a rear and side of said cylindrical main body, wherein an axial penetration hole in said back body is stepped through a taper from a larger hole positioned apart from said cylindrical main body to a smaller hole positioned adjacent said cylindrical main body, wherein a brim of said penetration hole formed at the rear of said cylindrical main body has a curved surface and wherein an outer edge of said brim has a diameter greater than said smaller hole.

5. The optical connector of claim 4, wherein an angle of said taper is less than ninety degrees.

6. The optical connector of claim 5, wherein said angle of said taper is greater than ten degrees.

7. The optical connector of claim 4, wherein a cylinder projected from a wall of the smaller hole toward the cylindrical main body intersects said curved surface of said brim at a position which has a tangent angle of less than or equal to forty-five degrees with respect to a center axis of said penetration hole in said cylindrical main body.

8. The optical connector of claim 7, wherein said curved surface of said brim has a radius of curvature of 0.2 to 0.5 mm.

9. The optical connector of claim 8, wherein a deviation distance between the center axis of the penetration hole in the cylindrical main body and the center axis of the smaller hole in the back body is 20 μm or less.

* * * * *